(12) United States Patent
Arai

(10) Patent No.: US 12,206,662 B2
(45) Date of Patent: Jan. 21, 2025

(54) NON-TRANSITORY COMPUTER-READABLE RECORDING MEDIUM STORING COMPUTER-READABLE INSTRUCTIONS FOR SERVER, SERVER, AND METHOD EXECUTED BY SERVER

(71) Applicant: BROTHER KOGYO KABUSHIKI KAISHA, Nagoya (JP)

(72) Inventor: Kentaro Arai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 273 days.

(21) Appl. No.: 17/811,178

(22) Filed: Jul. 7, 2022

(65) Prior Publication Data

US 2023/0008132 A1    Jan. 12, 2023

(30) Foreign Application Priority Data

Jul. 8, 2021 (JP) .................................. 2021-113788

(51) Int. Cl.
*H04L 29/06* (2006.01)
*G06F 21/45* (2013.01)
*H04L 9/40* (2022.01)

(52) U.S. Cl.
CPC .......... *H04L 63/0846* (2013.01); *G06F 21/45* (2013.01); *H04L 63/083* (2013.01)

(58) Field of Classification Search
CPC .................................................. H04L 63/0846
See application file for complete search history.

(56) References Cited

U.S. PATENT DOCUMENTS

| 2002/0051167 A1* | 5/2002 | Francis | G07C 9/20 358/1.14 |
| 2002/0062453 A1* | 5/2002 | Koga | G06F 21/608 726/32 |
| 2015/0131126 A1* | 5/2015 | Daniels | G06F 3/122 358/1.15 |
| 2019/0004752 A1* | 1/2019 | Yamada | G06F 3/1267 |

FOREIGN PATENT DOCUMENTS

JP         2019016834 A      1/2019

\* cited by examiner

*Primary Examiner* — Bradley W Holder
(74) *Attorney, Agent, or Firm* — Scully, Scott, Murphy & Presser, PC

(57) ABSTRACT

A server may receive, from a terminal device, a change instruction for changing a password of a communication device different from the server and the terminal device. The server may, in a case where the change instruction is received from the terminal device, send first authentication information to the terminal device. The first authentication information may be inputted to the communication device by a user of the terminal device after the first authentication information has been sent to the terminal device. The server may, in a case where the first authentication information is inputted to the communication device, receive the first authentication information from the communication device. The server may, in a case where the first authentication information is received from the communication device, send a change permission notification to the communication device. The change permission notification may be a notification to permit the communication device to change the password.

10 Claims, 6 Drawing Sheets

(Printer Registration Sequence)

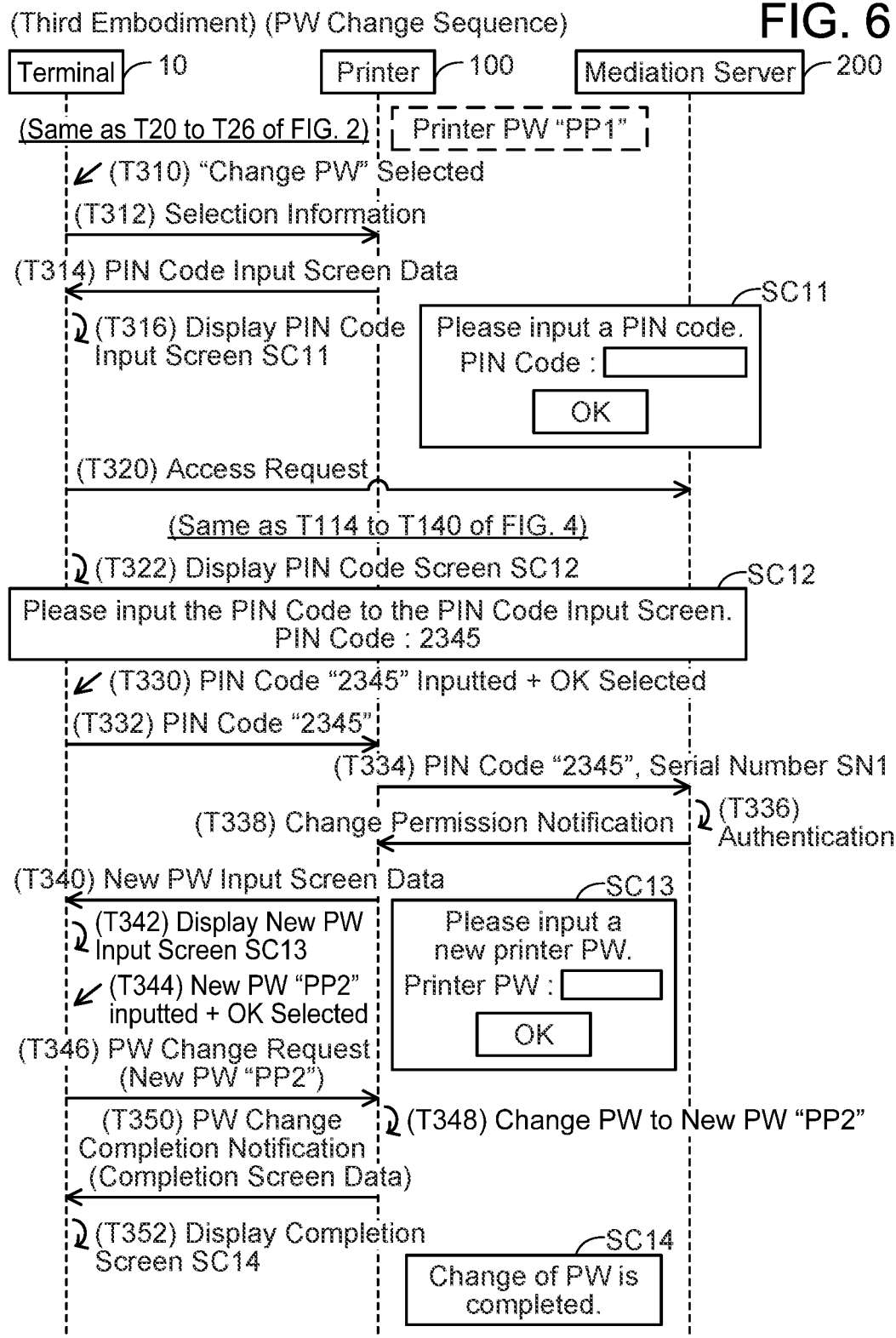

NON-TRANSITORY COMPUTER-READABLE RECORDING MEDIUM STORING COMPUTER-READABLE INSTRUCTIONS FOR SERVER, SERVER, AND METHOD EXECUTED BY SERVER

REFERENCE TO RELATED APPLICATIONS

This application claims priority from Japanese Patent Application No. 2021-113788 filed on Jul. 8, 2021. The entire contents of the priority application is incorporated herein by reference.

BACKGROUND ART

A technology for changing a security code for using a Multi-Function Peripheral (MFP) is known. In this technology, the MFP executes a process for changing the security code when accepting input of a wrong security code from a user.

DESCRIPTION

The disclosure herein provides a technology for securely changing a password of a communication device.

A non-transitory computer-readable recording medium storing computer-readable instructions for a server is disclosed herein. The computer-readable instructions, when executed by a processor of the server, may cause the server to: receive, from a terminal device, a change instruction for changing a password of a communication device different from the server and the terminal device; in a case where the change instruction is received from the terminal device, send first authentication information to the terminal device, wherein the first authentication information is inputted to the communication device by a user of the terminal device after the first authentication information has been sent to the terminal device; in a case where the first authentication information is inputted to the communication device, receive the first authentication information from the communication device; and in a case where the first authentication information is received from the communication device, send a change permission notification to the communication device, wherein the change permission notification is a notification to permit the communication device to change the password.

According to the configuration above, the server sends the first authentication information to the terminal device when receiving the change instruction from the terminal device. Thereafter, when the first authentication information is inputted to the communication device by the user of the terminal device, the server receives the first authentication information from the communication device and sends the change permission notification to the communication device. As a result, password change is permitted at the communication device. Thus, the password of the communication device can be securely changed.

A computer-readable recording medium storing the computer-readable instructions as mentioned above, a server, and a method executed by the server are also novel and useful. Further, a communication system comprising the server, the communication device, and the terminal device is also novel and useful.

FIG. 6 illustrates a sequence diagram for password change.

Figure 1:
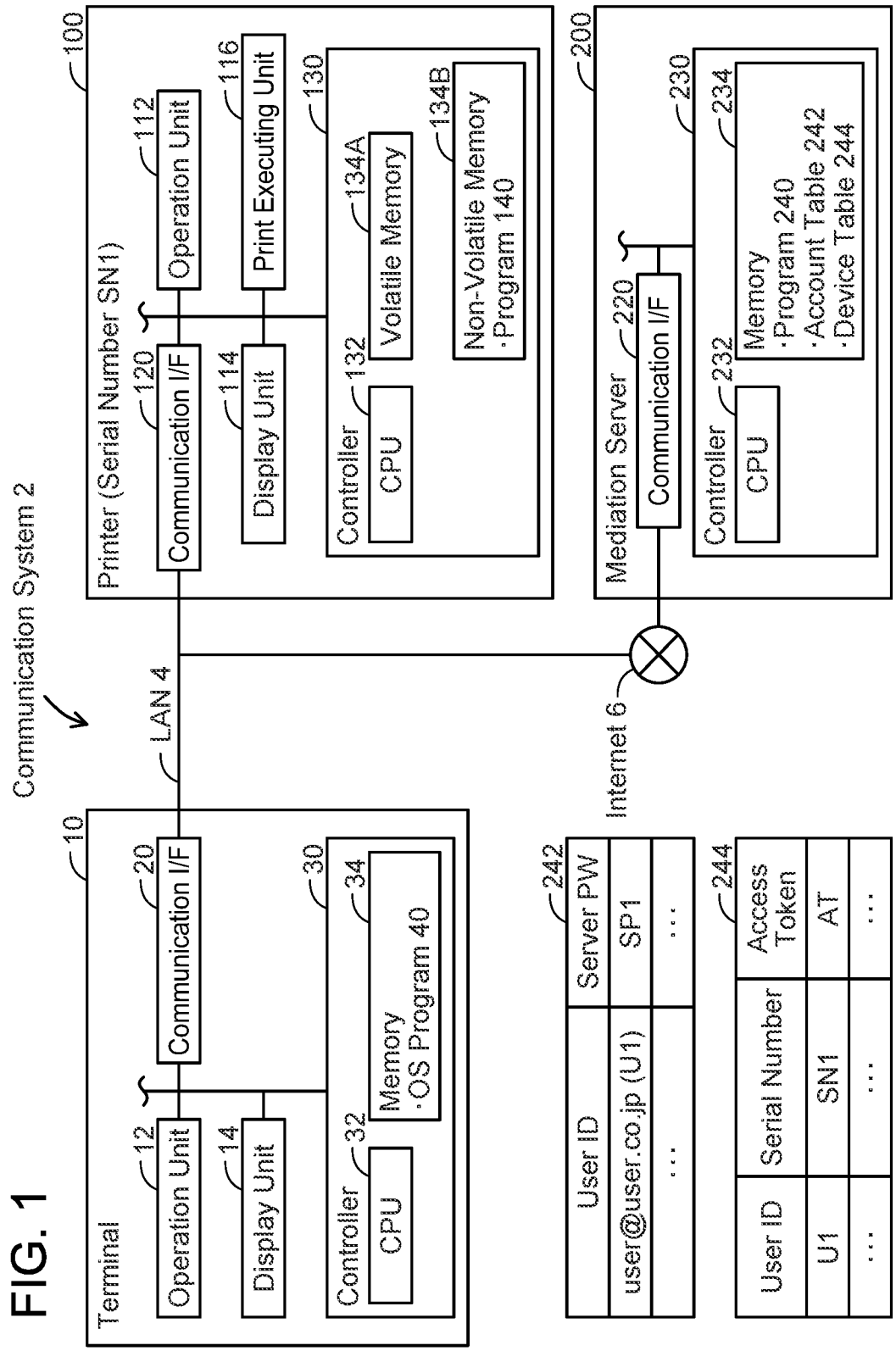
FIG. 1 illustrates a configuration of a communication system.

FIRST EMBODIMENT (Configuration of Communication System; FIG. 1)

As illustrated in FIG. 1, a communication system 2 comprises a terminal 10, a printer 100, and a mediation server 200. The terminal 10 and the printer 100 are connected to a LAN (local area network) 4 and are communicable with each other via the LAN 4. The LAN 4 is connected to the Internet 6, and the mediation server 200 is installed on the Internet 6. Thus, the terminal 10 and the printer 100 are communicable with the mediation server 200 via the Internet 6. Hereinafter, the mediation server 200 will be abbreviated as "server 200". The disclosure herein provides a technology that allows an administrator of the printer 100 to change a printer password of the printer 100 in a situation where he/she has forgotten the printer password of the printer 100.

(Configuration of Terminal 10)

The terminal 10 may be a portable terminal such as a smartphone, a laptop PC, a tablet PC, or the like, or may be a stationary terminal such as a desktop PC or the like. The terminal 10 is used by the administrator who administrates the printer 100. The terminal 10 comprises an operation unit 12, a display unit 14, a communication interface 20, and a controller 30. Hereinafter, interface will be denoted as "I/F".

The operation unit 12 is a button, a touch screen, or the like configured to be operated by the user. The user can input various instructions to the terminal 10 by operating the operation unit 12. The display unit 14 is a display for displaying various information. The communication I/F 20 is connected to the LAN 4.

The controller 30 comprises a CPU 32 and a memory 34. The CPU 32 executes various processes in accordance with an OS (operating system) program 40 stored in the memory 34. The memory 34 is configured of a volatile memory, a non-volatile memory, etc. The OS program 40 is a program for implementing basic operations of the terminal 10.

(Configuration of Printer 100)

The printer 100 is a peripheral device (e.g., a peripheral device of the terminal 10) configured to execute a print function. In a modification, the printer 100 may be a multifunctional device configured to execute a scan function, a FAX function, etc. in addition to the print function. The printer 100 has a serial number SN1 which is information for identifying the printer 100. The printer 100 comprises an operation unit 112, a display unit 114, a print executing unit 116, a communication I/F 120, and a controller 130.

The operation unit 112 is a button, a touch screen, or the like configured to be operated by the user. The user can input various instructions to the printer 100 by operating the operation unit 112. The display unit 114 is a display for displaying various information. The print executing unit 116 comprises a print mechanism of inkjet scheme, laser scheme, or the like. The communication I/F 120 is connected to the LAN 4.

The controller 130 comprises a CPU 132, a volatile memory 134A, and a non-volatile memory 134B. The CPU 132 executes various processes in accordance with a program 140 stored in the non-volatile memory 134B.

(Configuration of Server 200)

The server 200 mediates various communication for changing the password of the printer 100. The server 200 comprises a communication I/F 220 and a controller 230. The communication I/F 220 is connected to the Internet 6. In the present embodiment, the printer password is not notified to the server 200 from the printer 100. Thus, the printer password is not stored in the server 200.

The controller 230 comprises a CPU 232 and a memory 234. The CPU 232 executes various processes in accordance with a program 240 stored in the memory 234. The memory 234 is configured of a volatile memory, a non-volatile memory, etc. The memory 234 further stores an account table 242 and a device table 244.

The account table 242 stores one or more pieces of account information corresponding to one or more users. Each account information is information required to log in to the server 200. A user ID and a server password are associated with each other in each account information. Hereinafter, password will be denoted as "PW". In the present embodiment, e-mail address(es) is(are) used as the user ID(s). In a modification, the user ID(s) may be character string(s) designated by the user(s), instead of e-mail address(es). In the example of FIG. 1, a user ID "user@user.co.jp" which is an e-mail address of the user of the terminal 10 (i.e., the administrator of the printer 100) and a server PW "SP1" are stored in association with each other. Hereinafter, the user ID "user@user.co.jp" will be simply denoted as the user ID "U1".

The device table 244 stores one or more pieces of information related to one or more devices (e.g., printer(s)). In the device table 244, user ID(s), serial number(s), and Access Token(s) are stored in association with each other. Each Access Token is information used to execute communication between the server 200 and the device identified by the serial number associated with the Access Token. In the example of FIG. 1, the user ID "U1", the serial number SN1, and an Access Token "AT" are stored in association with each other in the device table 244.

Figure 2:
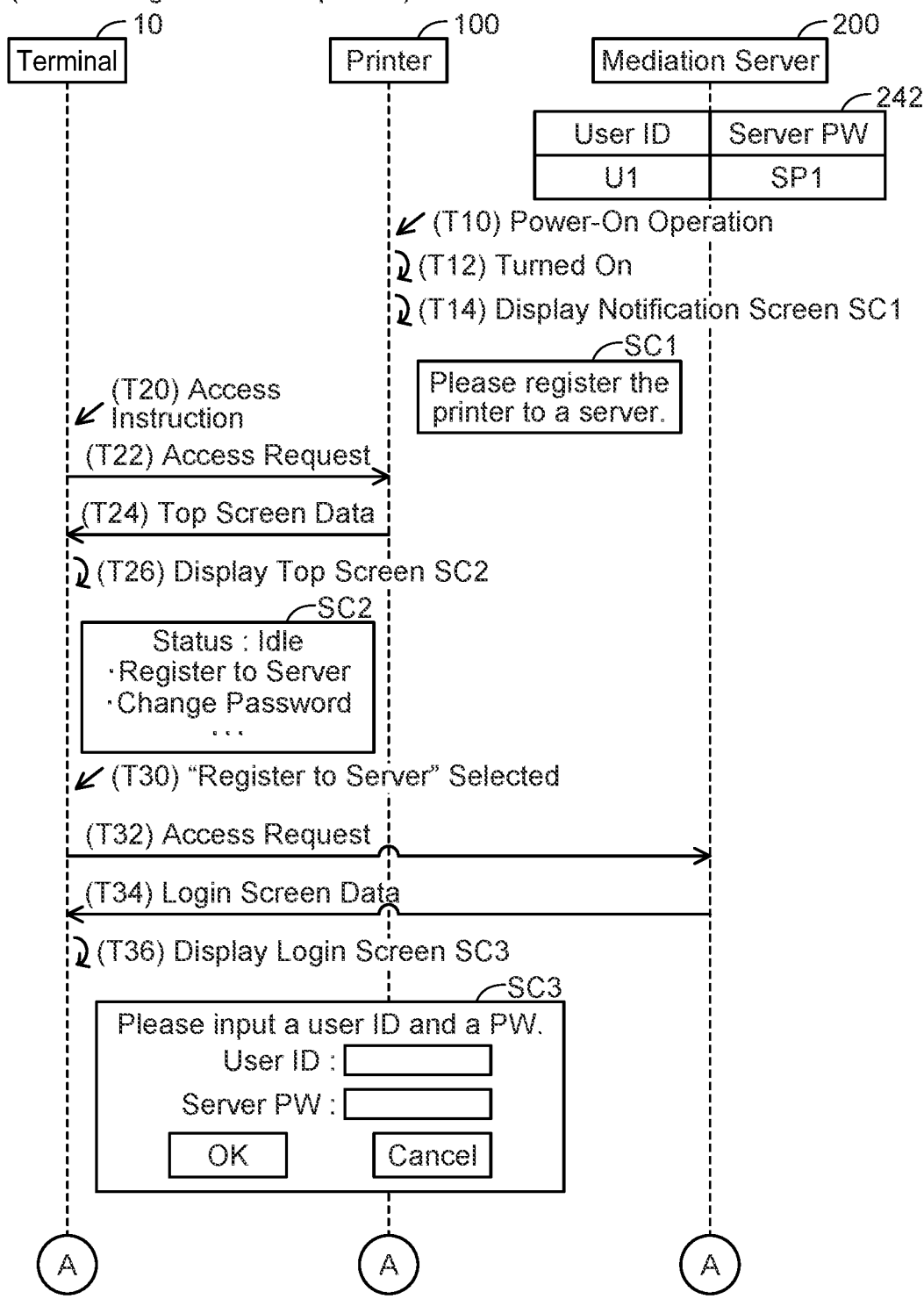
FIG. 2 illustrates a sequence diagram for printer registration.
Figure 3:
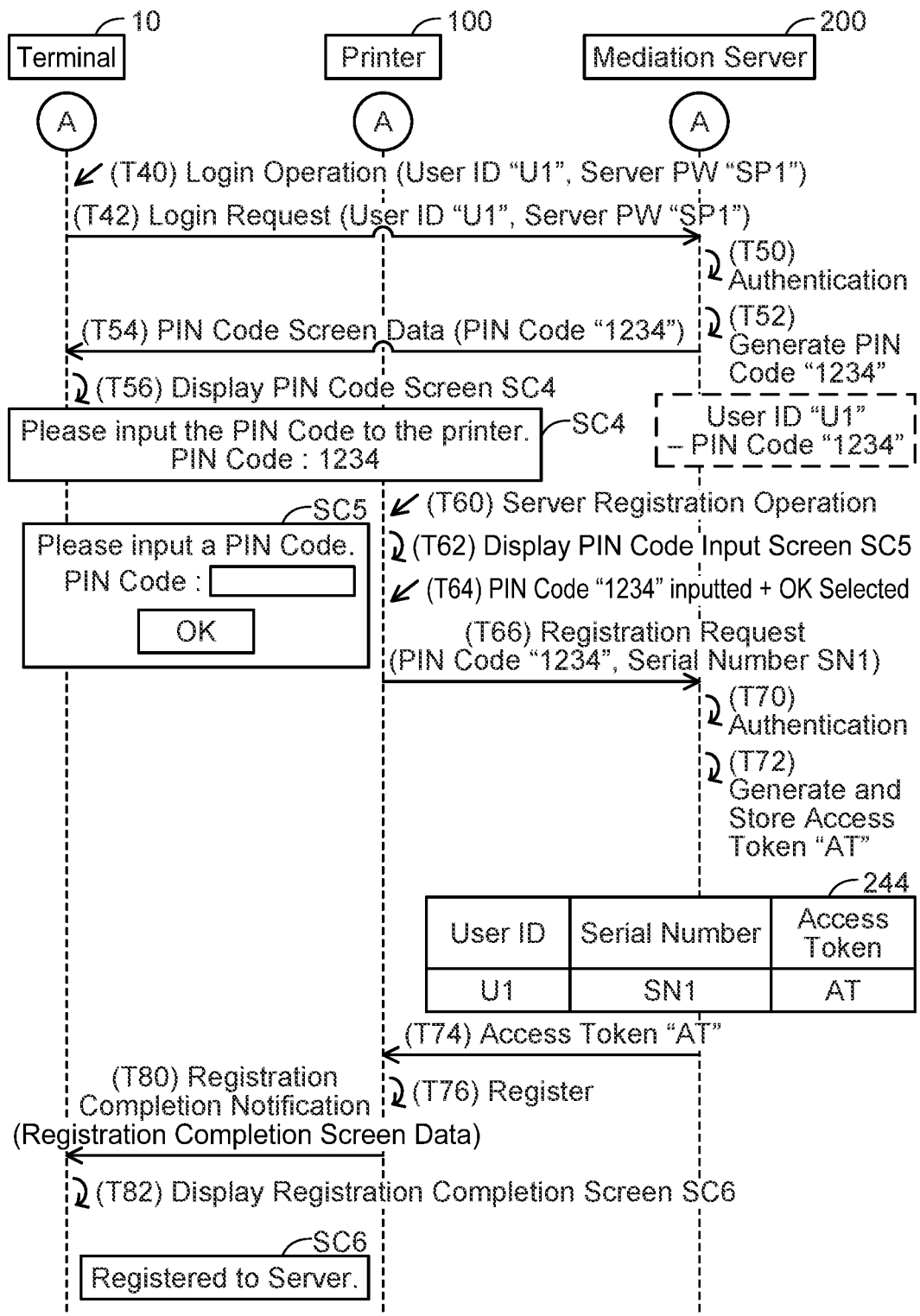
FIG. 3 illustrates a sequence diagram continued from FIG. 2.

(Printer Registration Sequence; FIGS. 2 and 3)

Referring to FIGS. 2 and 3, a process for registering information related to the printer 100 in the server 200 will be described. Hereinafter, for easier understanding, steps executed by the CPUs of devices (e.g., 32, 132, 232) will be described with the devices (e.g., the terminal 10, the printer 100, the server 200) as the subjects of action rather than describing with the CPUs as the subjects of action. Further, since communication between the devices is each executed via their communication I/Fs (e.g., 20, 120, 220) unless otherwise stated, a phrase "via the communication I/F" will be omitted in the following description on communication between the devices.

In an initial state of FIG. 2, the account table 242 already stores account information for the user of the terminal 10 (i.e., the administrator of the printer 100) (i.e., the user ID "U1" and the server PW "SP1"). Further, in the initial state of FIG. 2, the device table 244 does not store information related to the printer 100 (i.e., the serial number and an Access Token) yet.

When the printer 100 accepts a power-on operation from the administrator in T10, it is turned on in T12. At this time, the printer 100 determines that information related to the printer 100 itself has not been registered in the server 200 yet. Specifically, the printer 100 determines that the information has not been registered in the server 200 because an Access Token has not been stored in the non-volatile memory 134B yet. In this case, the printer 100 causes the display unit 114 to display a notification screen SC1 in T14. The notification screen SC1 includes a message that prompts the user to register the information related to the printer 100 in the server 200.

When seeing the notification screen SC1, the administrator performs an operation for registering the information related to the printer 100 in the server 200 using the terminal 10. Specifically, the terminal 10 first accepts an access instruction for accessing a web server function of the printer 100 from the administrator in T20. This access instruction includes designation of an IP address (not illustrated) of the printer 100. In this case, the terminal 10 sends an access request to the printer 100 in T22 using a web browser program (not illustrated). The following steps executed by the terminal 10 are also executed by using the web browser program.

When receiving the access request from the terminal 10 in T22, the printer 100 sends top screen data representing a top screen SC2 to the terminal 10 in T24.

When receiving the top screen data from the printer 100 in T24, the terminal 10 causes the display unit 14 to display the top screen SC2 in T26. The top screen SC2 includes the current status of the printer 100 (which is "Idle" in the example of FIG. 2) and a plurality of buttons for changing settings of the printer 100 (e.g., a "Register to Server" button, a "Change Password" button, etc.).

In T30, the terminal 10 accepts selection of the "Register to Server" button in the top screen SC2. In this case, the terminal 10 sends an access request to the server 200 in T32.

When receiving the access request from the terminal 10 in T32, the server 200 sends login screen data representing a login screen SC3 to the terminal 10 in T34.

When receiving the login screen data from the server 200 in T34, the terminal 10 causes the display unit 14 to display the login screen SC3 in T36. The login screen SC3 includes a message that prompts input of account information (i.e., a user ID and a server PW) for login to the server 200, a user ID entry field, a server PW entry field, an OK button, and a cancel button.

(Continuation from FIG. 2; FIG. 3)

The terminal 10 accepts a login operation from the administrator in T40 of FIG. 3. The login operation includes an operation of inputting the user ID "U1" and the server PW "SP1" in the login screen SC3. In this case, the terminal 10 sends the server 200 a login request including the inputted user ID "U1" and server PW "SP1" in T42.

When receiving the login request from the terminal 10 in T42, the server 200 executes authentication in T50. Specifically, the server 200 determines whether the combination of the user ID "U1" and the server PW "SP1" included in the received login request is in the account table 242 or not. Since this combination is in the account table 242 in the present case (see the initial state of FIG. 2), the server 200 determines that the authentication succeeds. In this case, in T52, the server 200 generates a PIN code "1234" and stores the PIN code "1234" in the memory 234 in association with the user ID "U1" included in the received login request. The server 200 then sends PIN code screen data representing a PIN code screen SC4 to the terminal 10 in T54. If the server 200 determines in T50 that the combination of the user ID and the server PW included in the received login request is not in the account table 242, that is, if the authentication fails, steps from T52 and onward are not executed.

When receiving the PIN code screen data from the server 200 in T54, the terminal 10 causes the display unit 14 to display the PIN code screen SC4 in T56. The PIN code screen SC4 includes the PIN code "1234" and a message that prompts input of the PIN code to a printer to be registered in the server 200 (which is the printer 100 in the present case). Thus, the administrator is able to know that the PIN code "1234" displayed in the PIN code screen SC4 should be inputted to the printer 100.

When the printer 100 accepts a server registration operation from the administrator who saw the PIN code screen SC4 in T60, it causes the display unit 114 to display a PIN code input screen SC5 in T62. The PIN code input screen SC5 includes a message that prompts input of a PIN code, a PIN code entry field, and an OK button.

When the printer 100 accepts input of the PIN code "1234" and selection of the OK button in the PIN code input screen SC5 in T64, it sends a registration request to the server 200 in T66. The registration request includes the inputted PIN code "1234" and the serial number SN1 of the printer 100.

When receiving the registration request from the printer 100 in T66, the server 200 executes authentication in T70. Specifically, the server 200 determines whether the PIN code "1234" included in the received registration request has been already stored in the memory 234 or not. Since the PIN code "1234" has been already stored in the memory 234 in the present case (see T52), the server 200 determines that the authentication succeeds. In this case, the server 200 generates an Access Token "AT" in T72. Hereinafter, the Access Token "AT" may be simply denoted as "AT". The server 200 then specifies the user ID "U1" stored in the memory 234 in association with the PIN code "1234" (see T52). Then, the server 200 stores the specified user ID "U1", the serial number SN1 included in the registration request, and the generated Access Token "AT" in association with each other in the device table 244. In this manner, the information related to the printer 100 is registered in the server 200.

The server 200 sends the "AT" to the printer 100 in T74. If the PIN code included in the registration request has not been stored in the memory 234 in T70, that is, if the authentication fails, the server 200 does not execute steps from T72 and onward.

When receiving the "AT" from the server 200 in T74, the printer 100 registers the "AT" in the non-volatile memory 134B in T76. As a result, a so-called continuous connection is established between the printer 100 and the server 200, although this is not illustrated. By using the continuous connection, the server 200 can send signals to the printer 100 beyond the firewall of the LAN 4 where the printer 100 belongs, without receiving requests from the printer 100. That is, the continuous connection allows for server-push communication. The continuous connection is a connection according to, for example, XMPP (Extensible Messaging and Presence Protocol).

When the registration of the "AT" is completed, the printer 100 sends the terminal 10 a registration completion notification indicating that the registration in the server 200 has been completed in T80. The registration completion notification includes registration completion screen data representing a registration completion screen SC6.

When receiving the registration completion notification from the printer 100 in T80, the terminal 10 causes the display unit 14 to display the registration completion screen SC6 in T82. The registration completion screen SC6 includes a message indicating that the registration in the server 200 has been completed. The administrator is able to know that the registration in the server 200 has been completed by seeing the registration completion screen SC6.

Figure 4:
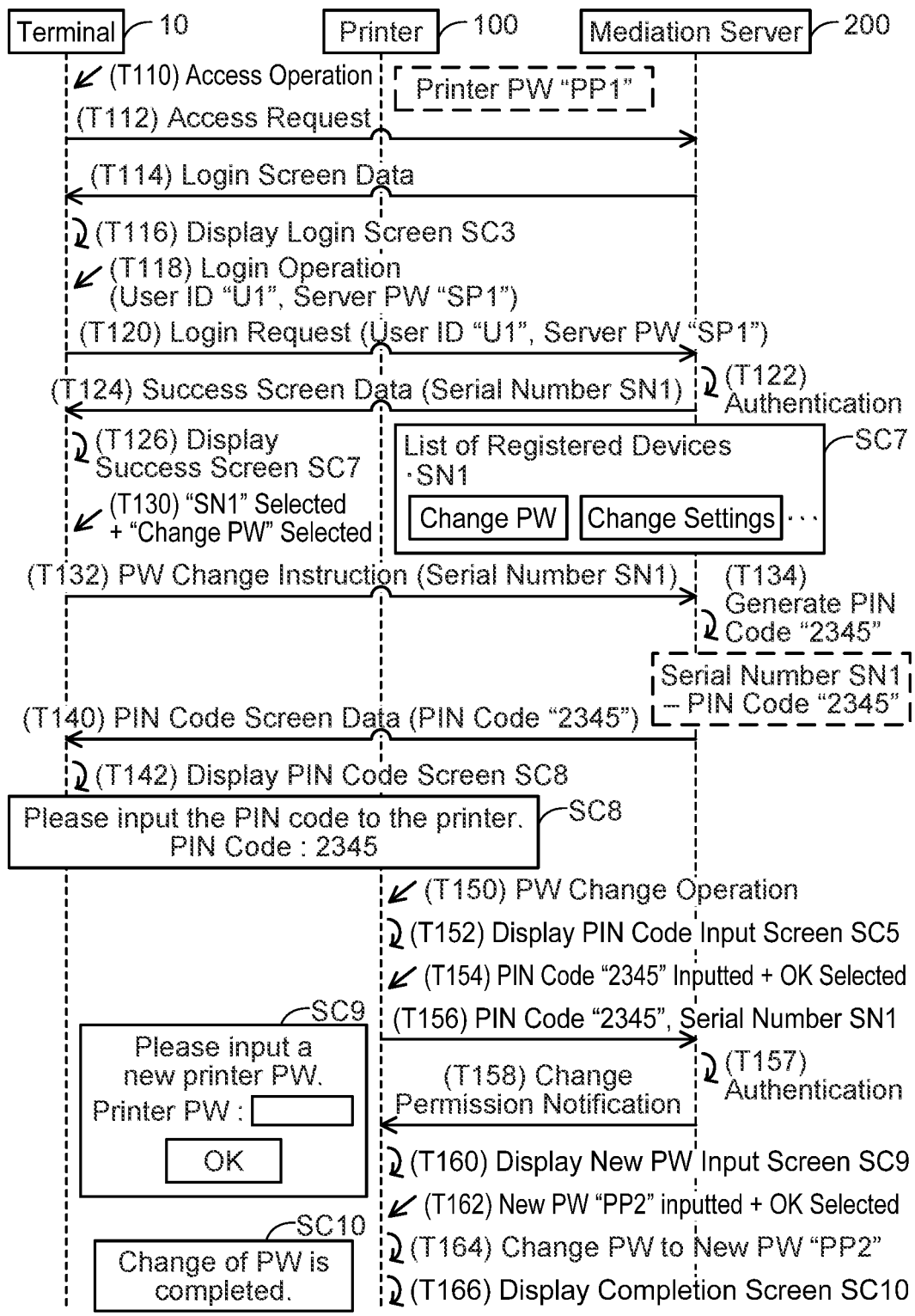
FIG. 4 illustrates a sequence diagram for password change.

(PW Change Sequence; FIG. 4)

Referring to FIG. 4, a process for changing the PW of the printer 100 will be described. The process of FIG. 4 is executed after the process of FIG. 3 has been completed. In an initial state of FIG. 4, the printer PW of the printer 100 is a printer PW "PP1". The process of FIG. 4 is executed, for example, in a case where the administrator has forgotten the printer PW "PP1" of the printer 100.

When the terminal 10 accepts an operation for accessing the server 200 (i.e., an operation of inputting a Uniform Resource Locator (URL) of the server 200) from the administrator in T110, it sends an access request to the server 200 in T112. T112 to T116 are the same as T32 to T36 in FIG. 2. T118 to T122 are the same as T40 to T50 in FIG. 3.

When the server 200 determines that the authentication succeeds in T122, it sends success screen data representing a success screen SC7 to the terminal 10 in T124. The success screen data includes the serial number SN1 stored in the device table 244 in association with the user ID "U1" (see T72 in FIG. 3) for which the authentication succeeded.

When receiving the success screen data from the server 200 in T124, the terminal 10 causes the display unit 14 to display the success screen SC7 in T126. The success screen SC7 includes the serial number SN1 included in the received success screen data as a list of registered devices and a plurality of buttons for various processes to the device (e.g., a "Change PW" button, a "Change Settings" button, etc.).

When the terminal 10 accepts, from the administrator, selection of the serial number SN1 and selection of the "Change PW" button in the success screen SC7 in T130, it sends a PW change instruction to the server 200 in T132. The PW change instruction includes the selected serial number SN1. As described, the administrator can select a device for which he/she wishes to change the PW from among devices registered in the server 200. This improves convenience for the administrator because the administrator does not need to input information that identifies the device (e.g., serial number) for which he/she wishes to change the PW.

When receiving the PW change instruction from the terminal 10 in T132, the server 200 generates a PIN code "2345" and stores the serial number SN1 included in the PW change instruction and the generated PIN code "2345" in association with each other in the memory 234 in T134. The server 200 then sends PIN code screen data representing a PIN code screen SC8 to the terminal 10 in T140. The PIN code screen data includes the generated PIN code "2345".

When receiving the PIN code screen data from the server 200 in T140, the terminal 10 causes the display unit 14 to display the PIN code screen SC8 in T142. The PIN code screen SC8 includes the PIN code "2345" and a message that prompts input of the PIN code to a printer for which the PW is to be changed (which is the printer 100 in the present case). Thus, the administrator is able to know that the PIN code "2345" displayed in the PIN code screen SC8 should be inputted to the printer 100.

When the printer 100 accepts a PW change operation from the administrator who saw the PIN code screen SC8 in T150, it causes the display unit 114 to display the PIN code input screen SC5 in T152.

When the printer 100 accepts input of the PIN code "2345" and selection of the OK button in the PIN code input screen SC5 in T154, it sends the inputted PIN code "2345" and the serial number SN1 of the printer 100 to the server 200 in T156. As described, the PIN code "2345" is inputted directly from the administrator to the printer 100. It is highly probable that a person who can directly input the PIN code "2345" to the printer 100 is a legitimate user of the printer 100. Thus, the PW of the printer 100 can be changed securely.

When receiving the PIN code "2345" and the serial number SN1 from the printer 100 in T156, the server 200 executes authentication in T157. Specifically, the server 200 determines whether the combination of the received PIN code "2345" and serial number SN1 is in the memory 234 or not. Since this combination is in the memory 234 in the present case (see T134), the server 200 determines that the authentication succeeds. In this case, the server 200 sends a change permission notification to the printer 100 in T158. The change permission notification is a notification to permit the printer 100 to change its PW. If the combination above is not in the memory 234 in T157, that is, if the authentication fails, the server 200 does not execute steps from T158 and onward.

When receiving the change permission notification from the server 200 in T158, the printer 100 causes the display unit 114 to display a new PW input screen SC9 in T160. The new PW input screen SC9 includes a message that prompts input of a new printer PW, a printer PW entry field, and an OK button.

When the printer 100 accepts, from the administrator, input of a new PW "PP2" to the printer PW entry field and selection of the OK button in T162, it changes the printer PW from "PP1" to "PP2" in T164. As described, the administrator can change the printer PW from "PP1" to "PP2" by inputting the new PW "PP2" to the new PW input screen displayed at the printer 100. The printer 100 then causes the display unit 114 to display a completion screen SC10 in T166. The completion screen SC10 includes a message indicating that the printer PW change has been completed. The administrator is able to know that the printer PW change has been completed by seeing the completion screen SC10.

Effects of First Embodiment

As described, when receiving the PW change instruction from the terminal 10 (T132 in FIG. 4), the server 200 sends the PIN code screen data including the PIN code "2345" to the terminal 10 (T140). Thereafter, when the PIN code "2345" is inputted to the printer 100 by the administrator (T154), the server 200 receives the PIN code "2345" from the printer 100 (T156) and sends the change permission notification to the printer 100 (T158). As a result, the PW is changed in response to the new PW "PP2" being inputted at the printer 100. As described, changing the PW of the printer 100 is permitted only in a case where the PIN code "2345" which was sent from the server 200 to the terminal 10 is sent from the printer 100 to the server 200 and the printer 100 receives the change permission notification. Thus, the PW of the printer 100 can be securely changed.

Here, a first comparative example can be considered in which the PW of the printer 100 is changed without using the terminal 10 nor the server 200. In this comparative example, the PW of the printer 100 can be changed only by performing the PW change operation to the printer 100 (see T150 in FIG. 4). That is, anyone who can physically access the printer 100 can change the PW of the printer 100. Contrary to this, in the present embodiment, only the user who can log in to the server 200 (i.e., the user having high probability of being a legitimate user of the printer 100) can change the PW of the printer 100. That is, in the present embodiment, two-factor authentication that includes login to the server 200 and the authentication of the PIN code "2345" is executed when the PW of the printer 100 is to be changed. Thus, the PW of the printer 100 can be changed more securely.

Further, in the present embodiment, the administrator does not need to input the old PW "PP1" to the printer 100 to change the PW of the printer 100 to the new PW "PP2". Thus, even when the administrator has forgotten the old PW "PP1", he/she can change the PW of the printer 100.

Here, a second comparative example can be considered in which the PW is changed using a question for which the answer is determined in advance by the administrator (so-called "secret question") in a situation where the administrator has forgotten the old PW. In the second comparative example, the administrator inputs the answer to the secret question and changing the PW is permitted when authentication for the answer succeeds. On the other hand, in the present embodiment, the administrator can change the PW of the printer even when he/she does not remember the old printer PW, so long as he/she logs in to the server 200 using the user ID and the server PW to log in to the server 200. Generally, the secret question is a question related to personal information, and thus the answer to the secret question may be guessed, for example, from social media of the administrator. On the other hand, the user ID and the server PW to log into the server 200 are often character strings designated by the administrator, and thus the user ID and the server PW are less likely to be known by a third party than the answer to the secret question. Thus, according to the present embodiment, the printer PW can be changed more securely in a situation where the administrator has forgotten the old printer PW, compared to the second comparative example.

Further, a third comparative example can be considered in which the server 200 does not store the serial number SN1 and the PIN code "2345" in association with each other but stores only the PIN code "2345". In this comparative example, when the PIN code "2345" is inputted to a printer different from the printer 100 for which the administrator wishes to change the PW, the PIN code "2345" is sent from this different printer to the server 200. In this case, the server 200 determines that the authentication succeeds since the PIN code "2345" has been stored and then sends the change permission notification to the different printer. Thus, in the third comparative example, the PW of the printer different from the printer 100 for which the administrator wishes to change the PW may be changed. On the other hand, in the present embodiment, the serial number SN1 of the printer 100 and the PIN code "2345" are stored in association with each other (T134 in FIG. 4) and the server 200 determines whether the combination of the serial number SN1 and the PIN code "2345" has been stored or not (T157). Thus, when the PIN code "2345" is inputted to the printer different from the printer 100 for which the administrator wishes to change the PW, the serial number of the different printer and the PIN code "2345" are sent from the different printer to the server 200. In this case, the server 200 determines that the authentication fails since the combination of the serial number of the different printer and the PIN code "2345" has not been stored and does not send the change permission notification to the different printer. As above, according to the present embodiment, only the printer PW of the printer 100 for which the administrator wishes to change the PW can be changed. In a modification, the server 200 may not store the serial number SN1 and the PIN code "2345" in association with each other.

(Correspondence Relationships)

The terminal 10, the printer 100, and the server 200 are examples of "terminal device", "communication device (first external device)", and "server", respectively. The PIN code "2345" and the PIN code "1234" are examples of "first authentication information" and "specifying information", respectively. The combination of the user ID "U1" and the server PW "SP1" is an example of "target user information". The serial number SN1 is an example of "identification information". The success screen SC7 is an example of "success screen". Accepting selection of the serial number SN1 and selection of the "Change PW" button in T130 of FIG. 4 is an example of "a predetermined instruction is accepted".

T66 and T72 in FIG. 3 are examples of "receive a registration request" and "store the target user information", respectively. T120 and T124 in FIG. 4 are examples of "receive a login request" and "send success screen data", respectively. T132, T134, and T140 in FIG. 4 are examples of "receive, from a terminal device, a change instruction", "store the first authentication information and the identification information in association with each other in the memory", and "send first authentication information", respectively. T156 and T158 in FIG. 4 are examples of "receive the first authentication information" and "send a change permission notification", respectively.

Figure 5:
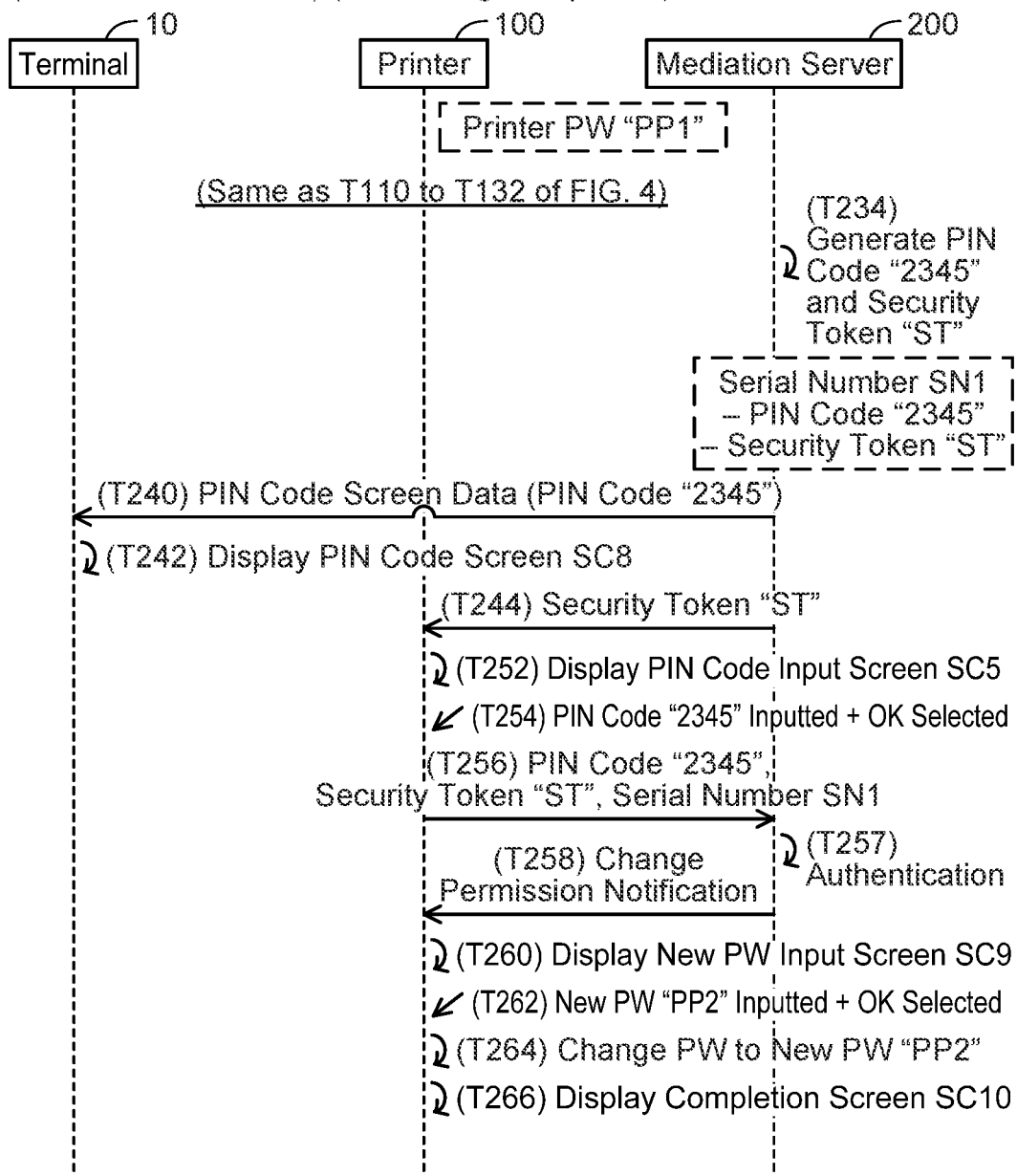
FIG. 5 illustrates a sequence diagram for password change.

Second Embodiment; FIG. 5

Referring to FIG. 5, a second embodiment will be described. The second embodiment differs from the first embodiment in that a Security Token is further used. An initial state of FIG. 5 is the same as the initial state of FIG. 4. In the process of FIG. 5, steps same as T110 to T132 in FIG. 4 are executed first.

The server 200 generates a PIN code "2345" and a Security Token "ST" in T234 of FIG. 5. Hereinafter, the Security Token "ST" may be simply denoted as "ST". After generating the PIN code "2345" and the "ST", the server 200 stores the serial number SN1 included in the PW change instruction (see T132 in FIG. 4), the generated PIN code "2345", and the generated "ST" in association with each other in the memory 234. The server 200 then sends PIN code screen data representing the PIN code screen SC8 to the terminal 10 in T240. The PIN code screen data includes the generated PIN code "2345". T242 is the same as T142 in FIG. 4.

The server 200 sends the generated "ST" to the printer 100 in T244 using the continuous connection (not illustrated) established between the printer 100 and the server 200. As a result, the printer 100 stores the "ST" received from the server 200 in the volatile memory 134A, although this is not illustrated. In a modification, the printer 100 may store the "ST" in the non-volatile memory 134B.

When receiving the "ST" from the server 200 in T244, the printer 100 causes the display unit 114 to display the PIN code input screen SC5 in T252. That is, when receiving the "ST" from the server 200, the printer 100 can display the PIN code input screen SC5 without accepting an operation from the administrator. Thus, convenience is improved for the administrator.

T254 is the same as T154 in FIG. 4. The printer 100 sends the inputted PIN code "2345", the "ST" stored in the volatile memory 134A, and the serial number SN1 of the printer 100 to the server 200 in T256.

When receiving the PIN code "2345", the "ST", and the serial number SN1 from the printer 100 in T256, the server 200 executes authentication in T257. Specifically, the server 200 determines whether the combination of the received PIN code "2345", the received "ST", and the received serial number SN1 is in the memory 234 or not. Since this combination is in the memory 234 in the present case (see T234), the server 200 determines that the authentication succeeds. In this case, the server 200 sends the change permission notification to the printer 100 in T258. If the combination above is not in the memory 234, that is, the authentication fails in T257, the server 200 does not execute steps from T258 and onward. T260 to T266 are the same as T160 to T166 in FIG. 4.

Effects of Second Embodiment

The PW of the printer 100 can be changed securely also in the second embodiment, as with the first embodiment. Especially, the "ST" is information generated by the server 200 when the server 200 receives the PW change instruction from the terminal 10 (T132 in FIG. 4 referenced in FIG. 5). The "ST" is sent to the printer 100 (T244 in FIG. 5) but is not displayed at the printer 100. That is, the "ST" is information that is not obtained by the user. On the other hand, the serial number SN1 is information that is displayed, for example, on the housing or in the manual of the printer 100, that is, information that can be obtained by the user.

Here, a situation can be considered in which a third party obtains the PIN code "2345" and the serial number SN1 of the printer 100 for which the administrator wishes to change the PW and the third party inputs the serial number SN1 and the PIN code "2345" to a printer different from the printer 100. In this case, the different printer sends the PIN code "2345" and the serial number SN1 to the server 200. Under such a situation, according to the first embodiment, the server 200 determines that the authentication succeeds since the combination of the PIN code "2345" and the serial number SN1 received from the different printer has been stored and then sends the change permission notification to the different printer. As a result, the PW of the different printer may be changed by the third party. On the other hand, according to the second embodiment, the different printer does not store the "ST", and as described, the third party cannot obtain the "ST". Thus, the server 200 determines that the authentication fails since it does not receive the "ST" from the different printer. As a result, the server 200 does not send the change permission notification to the different printer. Thus, the PW of the different printer cannot be changed by the third party. In this manner, according to the second embodiment, it is possible to prevent the PW of the different printer to be changed by the third party even when the PIN code "2345" and the serial number SN1 are obtained by the third party.

(Correspondence Relationships)

The Security Token "ST" is an example of "second authentication information". The PIN code input screen SC5 displayed in T252 of FIG. 5 is an example of "related screen". T234 and T244 in FIG. 5 are examples of "store the first authentication information and second authentication information in association with each other in the memory" and "send the second authentication information", respectively.

Third Embodiment; FIG. 6

Referring to FIG. 6, a third embodiment will be described. The third embodiment differs from the first embodiment in that the PW of the printer 100 is changed via a web server of the printer 100. An initial state of FIG. 6 is the same as the initial state of FIG. 4. In the process of FIG. 6, steps same as T20 to T26 in FIG. 2 are executed first.

The terminal 10 accepts selection of the "Change Password" button in the top screen SC2 (see FIG. 2) in T310 of FIG. 6. In this case, the terminal 10 sends selection information indicating that the "Change Password" button was selected to the printer 100 in T312.

When receiving the selection information from the terminal 10 in T312, the printer 100 sends PIN code input screen data representing a PIN code input screen SC11 to the terminal 10 in T314.

When receiving the PIN code input screen data from the printer 100 in T314, the terminal 10 causes the display unit 14 to display the PIN code input screen SC11 in T316. The PIN code input screen SC11 includes a message that prompts input of a PIN code, a PIN code entry field, and an OK button.

When the terminal 10 accepts the selection of the "Change Password" button in T310, it also sends an access request to the server 200 in T320. T320 is executed independently from T312 to T316. Specifically, in the present case, a browser session in which T312 to T316 are executed is different from a browser session in which T320 is executed. Thus, the PIN code input screen SC11 displayed in T316 and a PIN code screen SC12 displayed in T322 (which will be described later) are displayed in parallel on the display unit 14 by the different browser sessions.

Then, after steps same as T114 to T140 in FIG. 4 are executed, the terminal 10 causes the display unit 14 to display the PIN code screen SC12 in T322. As described, both the PIN code input screen SC11 and the PIN code screen SC12 are displayed on the display unit 14 of the terminal 10 in T322. The PIN code screen SC12 includes the PIN code "2345" and a message that prompts input of the PIN code to the PIN code input screen SC11. Thus, the administrator is able to know that the PIN code "2345" displayed in the PIN code screen SC12 should be inputted to the PIN code input screen SC11.

In T330, the terminal 10 accepts, from the administrator who saw the PIN code screen SC12, input of the PIN code "2345" to the PIN code entry field and selection of the OK button in the PIN code input screen SC11. In this case, the terminal 10 sends the inputted PIN code "2345" to the printer 100 in T332.

When receiving the PIN code "2345" from the terminal 10 in T332, the printer 100 sends the PIN code "2345" and the serial number SN1 of the printer 100 to the server 200 in T334.

When receiving the PIN code "2345" and the serial number SN1 from the printer 100 in T334, the server 200 executes authentication in T336. T336 is the same as T157 in FIG. 4. Further, T338 is the same as T158 in FIG. 4.

When receiving the change permission notification from the server 200 in T338, the printer 100 sends new PW input screen data representing a new PW input screen SC13 to the terminal 10 in T340.

When receiving the new PW input screen data from the printer 100 in T340, the terminal 10 causes the display unit 14 to display the new PW input screen SC13 in T342. The new PW input screen SC13 includes a message that prompts input of a new printer PW, a printer PW entry field, and an OK button.

When the terminal 10 accepts input of a new PW "PP2" to the printer PW entry field and selection of the OK button in T344, it sends a PW change request to the printer 100 in T346. The PW change request includes the inputted new PW "PP2".

When receiving the PW change request from the terminal 10 in T346, the printer 100 changes the printer PW from "PP1" to "PP2" in T348. The printer 100 then sends the terminal 10 a PW change completion notification that includes completion screen data representing a completion screen SC14 in T350.

When receiving the PW change completion notification from the printer 100 in T350, the terminal 10 causes the display unit 14 to display the completion screen SC14 in T352. The completion screen SC14 includes a message indicating that the printer PW change has been completed. The administrator is able to know that the printer PW change has been completed by seeing the completion screen SC14.

Effects of Third Embodiment

The PW of the printer 100 can be changed securely also in the third embodiment, as with the first embodiment. Especially, according to the present embodiment, the administrator does not need to approach the printer 100 to input the PIN code "2345" to the printer 100 since the administrator does not directly input the PIN code "2345" to the printer 100. Thus, convenience is improved for the administrator. The terminal 10 is an example of "second external device".

(Modification 1) The terminal 10 may send a PW change instruction that includes the new PW "PP2" as well as the serial number SN1 to the server 200 in T132 of FIG. 4. In this case, the server 200 may store the serial number SN1, the PIN code "2345", and the new PW "PP2" in association with each other in T134. The server 200 then may send a change permission notification including the new PW "PP2" associated with the PIN code "2345" to the printer 100 in T158. In this case, the printer 100 can omit T160 and T162.

(Modification 2) When the server 200 receives the PW change instruction including the serial number SN1 from the terminal 10 (T132 in FIG. 4), it may send an e-mail including the PIN code "2345" to the user ID "U1" associated with the serial number SN1 (i.e., send the e-mail to the e-mail address "user@user.co.jp"). Generally, a method of sending the "first authentication information" to the "terminal device" is not particularly limited.

(Modification 3) The terminal 10 may input the PIN code "2345" to the printer 100 via a Near Field Communication (NFC) connection. Specifically, the administrator may bring the terminal 10 that has received the PIN code "2345" closer to the printer 100 instead of step T150 in FIG. 4. In this case, an NFC connection is established between the terminal 10 and the printer 100 and the PIN code "2345" may be inputted to the printer 100 using this NFC connection. In another modification, the terminal 10 may input the PIN code "2345" to the printer 100 via a Bluetooth (registered trademark, BT) connection. In yet another modification, the terminal 10 may input the PIN code "2345" to the printer 100 via a Wi-Fi Direct (registered trademark, WFD) connection. Generally, a method of inputting the "first authentication information" to the "communication device" is not particularly limited.

(Modification 4) T110 to T130 in FIG. 4 may be omitted. In this case, when the terminal 10 accepts, from the administrator, a predetermined instruction for changing the PW and input of the serial number of a printer (e.g., the printer 100) for which the administrator wishes to change the PW, the terminal 10 may send a PW change instruction including this serial number to the server 200. That is, in the present modification, the terminal 10 can change the PW of the printer 100 without logging in to the server 200. In the present modification, the "memory" may not store the "user information". Further, in the present modification, "receive a registration request", "store the target user information specified by the specifying information and the identification information in association with each other in the memory", "receive a login request", and "send success screen data" can be omitted.

(Modification 5) The terminal 10 may display a PIN code input screen on the display unit 14 when the "Register to Server" button is selected in T30 of FIG. 2. Then, when the terminal 10 accepts input of the PIN code "1234" and input of the serial number SN1 of the printer 100 to be registered in the server 200 in the PIN code input screen, the terminal 10 may send a registration request including these information to the server 200. In the present modification, the terminal 10 is an example of the "first external device".

(Modification 6) T32 to T36 in FIG. 2 and T40 to T56 in FIG. 3 may be omitted. In this case, the printer 100 may display a screen for input of a user ID and a server PW when accepting the server registration operation (T60 in FIG. 3). In this case, the printer 100 may send a registration request including the inputted user ID and server PW and the serial number SN1 to the server 200. In the present modification, the user ID and the server PW are an example of the "specifying information".

(Modification 7) When the printer 100 receives the "ST" in T244 of FIG. 5, it may cause the display unit 114 to display an inquiry screen that inquires of the user whether the PIN code input screen SC5 is to be displayed or not. When it is instructed to display the PIN code input screen SC5 in the inquiry screen, the printer 100 may cause the display unit 114 to display the PIN code input screen SC5. In the present modification, the inquiry screen described above is an example of the "related screen". In another modification, the printer 100 may not display the PIN code input screen SC5 even though receiving the "ST" from the server 200. In this case, the printer 100 may display the PIN code input screen SC5 when receiving the PW change operation from the administrator (see T150, T152 in FIG. 4). In the present modification, a related screen which is related to input of the first authentication information may not be displayed at the "communication device" even though the "second authentication information" is sent to the "communication device".

(Modification 8) The administrator may perform the process of FIG. 6 using a terminal different from the terminal 10. In the present modification, this different terminal is an example of the "second external device".

(Modification 9) In the embodiments above, the processes of FIGS. 2 to 6 are implemented by software (e.g., the OS program 40, the programs 140, 240), however, at least one of these processes may be implemented by hardware such as a logic circuit.

What is claimed is:

1. A non-transitory computer-readable recording medium storing computer-readable instructions for a server,
    wherein the computer-readable instructions, when executed by a processor of the server, cause the server to:
        receive, from a terminal device, a change instruction for changing a password of a communication device different from the server and the terminal device;
        in a case where the change instruction is received from the terminal device, send first authentication information to the terminal device, wherein the first authentication information is inputted to the communication device by a user of the terminal device after the first authentication information has been sent to the terminal device;
        in a case where the first authentication information is inputted to the communication device, receive the first authentication information from the communication device; and
        in a case where the first authentication information is received from the communication device, send a change permission notification to the communication device, wherein the change permission notification is a notification to permit the communication device to change the password.

2. The non-transitory computer-readable recording medium as in claim 1, wherein
    the server comprises a memory configured to store one or more pieces of user information corresponding to one or more users,
    the computer-readable instructions, when executed by the processor, further cause the server to:
        receive a login request including target user information from the terminal device; and
        in a case where the target user information included in the login request is stored in the memory, send success screen data representing a success screen to the terminal device, and
    in a case where a predetermined instruction for changing the password of the communication device is accepted from the user in the success screen displayed at the terminal device after the success screen data has been sent to the terminal device, the change instruction is received from the terminal device.

3. The non-transitory computer-readable recording medium as in claim 2, wherein
    the computer-readable instructions, when executed by the processor, further cause the server to:
        receive a registration request from a first external device, wherein the registration request includes specifying information for specifying the target user information and identification information for identifying the communication device; and
        in a case where the registration request is received from the first external device, store the target user information specified by the specifying information and the identification information in association with each other in the memory,
    in a case where the login request is received from the terminal device after the target user information and the identification information have been stored in association with each other in the memory, the success screen data representing the success screen that includes the identification information stored in the memory in association with the target user information included in the login request is sent to the terminal device, and
    in a case where the predetermined instruction for changing the password of the communication device that is identified by the identification information included in the success screen is accepted from the user in the success screen displayed at the terminal device after the success screen data has been sent to the terminal device, the change instruction that includes the identification information is received from the terminal device.

4. The non-transitory computer-readable recording medium as in claim 3, wherein
the computer-readable instructions, when executed by the processor, further cause the server to:
in a case where the change instruction including the identification information is received from the terminal device, store the first authentication information and the identification information in association with each other in the memory,
in the case where the first authentication information is inputted to the communication device, the first authentication information and the identification information are received from the communication device, and
in a case where the first authentication information and the identification information have been received from the communication device and the received first authentication information and the received identification information are stored in association with each other in the memory, the change permission notification is sent to the communication device.

5. The non-transitory computer-readable recording medium as in claim 3, wherein
the computer-readable instructions, when executed by the processor, further cause the server to:
store the first authentication information and second authentication information in association with each other in the memory, wherein the second authentication information is different from the first authentication information; and
in a case where the change instruction including the identification information is received from the terminal device, send the second authentication information to the communication device identified by the identification information,
in a case where the second authentication information is sent to the communication device and the first authentication information is inputted to the communication device, the first authentication information and the second authentication information are received from the communication device, and
in a case where the first authentication information and the second authentication information are received from the communication device and the received first authentication information and the received second authentication information are stored in association with each other in the memory, the change permission notification is sent to the communication device.

6. The non-transitory computer-readable recording medium as in claim 5, wherein
the second authentication information is sent to the communication device in order to cause the communication device to display a related screen which is related to input of the first authentication information.

7. The non-transitory computer-readable recording medium as in claim 1, wherein
the first authentication information is inputted to the communication device by an operation unit of the communication device being operated by the user.

8. The non-transitory computer-readable recording medium as in claim 1, wherein
the communication device has a web server function, and the first authentication information is inputted to the communication device via the web server function of the communication device by a second external device different from the communication device being used by the user.

9. A server comprising:
a processor; and
a memory storing computer-readable instructions therein, the computer-readable instructions, when executed by the processor, causing the server to:
receive, from a terminal device, a change instruction for changing a password of a communication device different from the server and the terminal device;
in a case where the change instruction is received from the terminal device, send first authentication information to the terminal device, wherein the first authentication information is inputted to the communication device by a user of the terminal device after the first authentication information has been sent to the terminal device;
in a case where the first authentication information is inputted to the communication device, receive the first authentication information from the communication device; and
in a case where the first authentication information is received from the communication device, send a change permission notification to the communication device, wherein the change permission notification is a notification to permit the communication device to change the password.

10. A method executed by a server, the method comprising:
receiving, from a terminal device, a change instruction for changing a password of a communication device different from the server and the terminal device;
in a case where the change instruction is received from the terminal device, sending first authentication information to the terminal device, wherein the first authentication information is inputted to the communication device by a user of the terminal device after the first authentication information has been sent to the terminal device;
in a case where the first authentication information is inputted to the communication device, receiving the first authentication information from the communication device; and
in a case where the first authentication information is received from the communication device, sending a change permission notification to the communication device, wherein the change permission notification is a notification to permit the communication device to change the password.

* * * * *